Patented June 12, 1923.

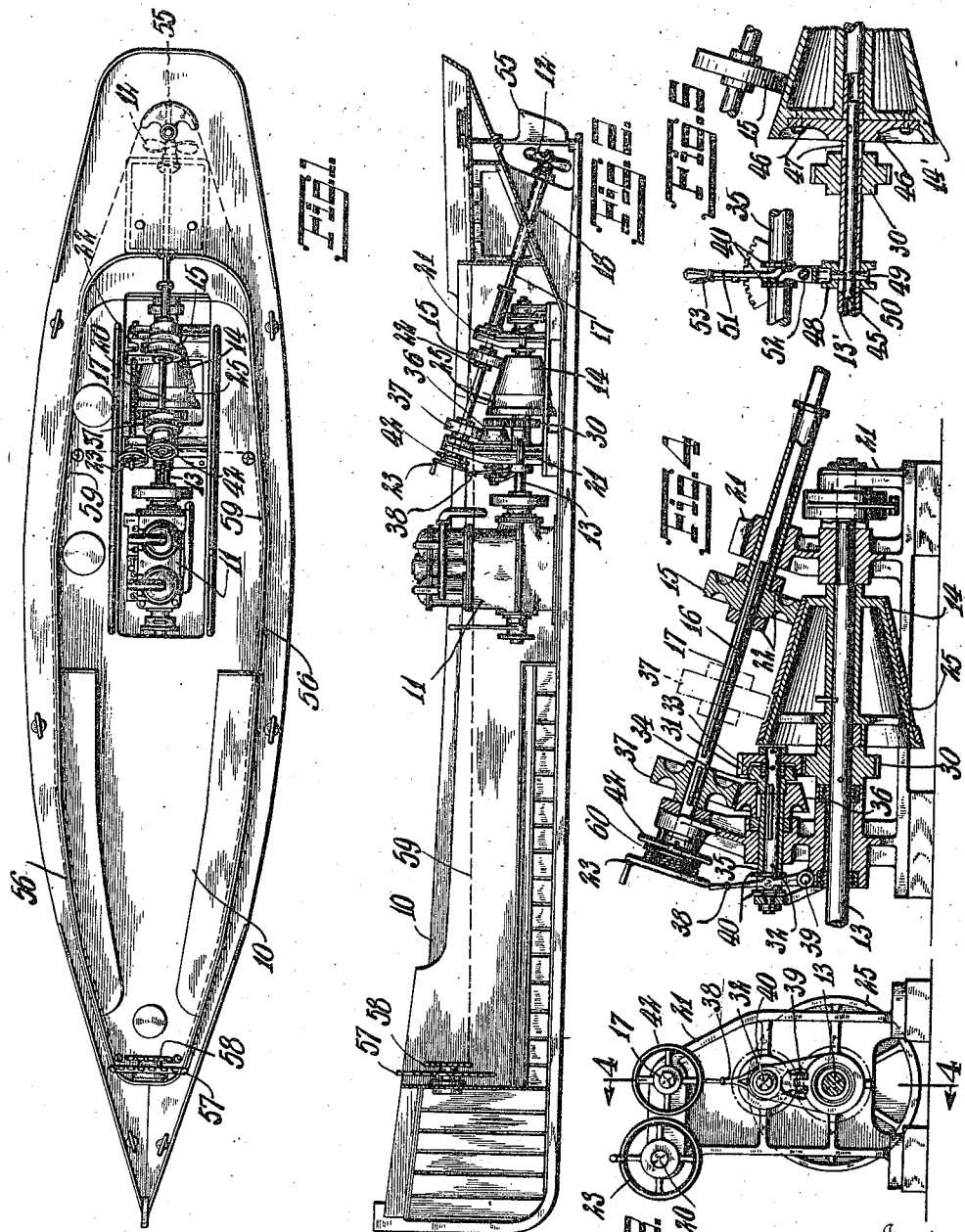

1,458,405

UNITED STATES PATENT OFFICE.

PAUL C. HAAN, OF UPPER NYACK, NEW YORK.

POWER-TRANSMISSION MEANS FOR BOATS.

Application filed August 12, 1922. Serial No. 581,329.

*To all whom it may concern:*

Be it known that I, PAUL C. HAAN, a citizen of the United States, residing at Upper Nyack, in the county of Rockland and State of New York, have invented certain new and useful Improvements in Power-Transmission Means for Boats, of which the following is a specification.

This invention relates to motor boats, having for an object the provision of a novel form of transmission means for driving the propeller at variable speeds relatively to the motor, a further object relating to the provision of a ready reversing means in connection with a cone pulley drive.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of a motor boat provided with my improved power transmission means.

Fig. 2 is a longitudinal vertical sectional view thereof.

Fig. 3 is an end view of the power transmission device.

Fig. 4 is a longitudinal vertical section on the line 4—4 of Fig. 3.

Fig. 5 is a similar view to Fig. 4 but showing a modification.

Referring now to the drawings the reference numeral 10 indicates a boat hull of ordinary construction. Suitably mounted in the hull is an internal combustion engine 11 which drives an ordinary screw propeller 12 through the medium of my improved transmission means.

Upon the extended end of the crank shaft 13 of the engine is fixed a conical drum 14 and its periphery is frictionally engaged by the periphery of a disk 15 feathered as indicated at 16 upon a shaft 17 which extends inwardly and downwardly and has the propeller 12 fixed on its rear end, the shaft passing through a suitable bearing 18 in the stem of the boat, the inclination of the shaft being such as to cause it to be parallel to the adjacent side of the drum 14.

The disk 15 is adjusted along the drum 14 by means of a screw 20 swiveled in suitable offsets from a bearing element 21 which supports the various parts of the transmission, the screw being threaded through a forked bracket 22 whose legs engage on opposite sides of the disk, the screw having a handwheel 23 on one end for turning purposes. Formed in the drum 14, near the large end thereof, is a circumferential groove 24 of sufficient width to accommodate the edge of the disk 15.

By turning the handwheel 23 the disk 15 may be adjusted along the drum 14 varying the speed ratio of the shafts 13 and 17 as the disk contacts with the larger or smaller part of the drum, as will be apparent. By moving the disk 15 into registry with the groove 25 in the drum 14 the latter is disengaged from driving relation to the shaft 17.

With the disk in this latter position the reversing device may be brought into action. This reversing device comprises a gear 30 fixed on the engine shaft 13 and meshing with a second gear 31 carried on a stub shaft 32 journaled in the bearing element 21 above the shaft 13. The gear 31 is formed with an interior conical clutch face 33 which is adapted to be engaged by a clutch member 34 formed on one end of a sleeve 35 freely surrounding the shaft 32 and having a small cone drum 36 fixed thereon, this cone drum being adapted to engage a disk 37 fixed on the propeller shaft 16. The parts are so proportioned that by moving the sleeve 35 longitudinally the clutch members 33, 34 and the drum 36 and disk 37, move simultaneously into and out of engagement. The sleeve 35 may be moved along shaft 32 by means of a hand lever 38 fulcrumed as at 39 to the bearing element 21 and engaging between a pair of flanges 40 on the sleeve.

As will be understood, gear 31 rotates continuously with shaft 13, but has operative relation with the drum 36 only when the sleeve 35 is moved forward to engage the clutch members 33 and 34. In case of failure of the engine, the disk 15 may be moved into engagement with the groove 25 and shaft 17 rotated directly by hand, a wheel 42 being provided on the forward end of the shaft for this purpose.

In Fig. 5 I have shown a modified construction arranged to ensure of the disengagement of the forward drive when the reverse drive is connected. In this arrangement the engine shaft 13′ is of hollow construction and has slidable therein a rod 45 which passes through the centre of gear 30. Upon the shaft 13 is loosely mounted the cone drum 14′ adapted to be engaged by the disk 15, this cone drum having a series of radial claws 46 suitably fixed thereto and which pass through longitudinal slots 47 in the shaft 13′ and engage at their inner ends in sockets in one end of the rod 45.

Freely surrounding the shaft 13′, adjacent, the opposite end of the rod 45, is a grooved collar 48 which is rigidly connected to the rod 45 by means of a pin 49 fixed at its ends therein and passing through the rod, this pin being accommodated in radial slots 50 in the shaft 13′. Suitably engaged with the groove in the collar 48 is the forked end of a hand lever 51 which also engages between the flanges 40 of the sleeve, the fulcrum point 52 of the lever being between the shafts 13′ and 32. The lever is provided with an ordinary locking device 53. The rest of the transmission is as shown in Fig. 4.

When the lever 51 is moved in the direction of the arrow the rod 45 will be pulled in an opposite direction, drawing with it the drum 14′ and freeing it from the disk 15, while at the same time the cone members 33, 34 and the drive elements 36, 37 are engaged. As will be apparent, the claws 46, projecting through the slots 47, form a feather connection between the shaft 13′ and drum 14′ whereby the former drives the latter.

To steer the boat I provide an ordinary rudder 55 operated by ropes 56 from a steering wheel 57 located at the front of the boat. To enable the helmsman to carry the engine speed without leaving his position I provide a second wheel 58 to which connect in the usual manner ropes 59 leading over a drum 60 on the screw 20.

Having thus described my invention what I claim as new and desire to protect by Letters Patent of the United States is as follows:

1. A power transmission means comprising a conical drive drum a shaft on which said drum is fixed, a disk frictionally engaged with said drum, a shaft on which said disk is feathered said second shaft being inclined to the first shaft means for moving said disk along said shaft, and reversing means comprising a gear fixed on said first shaft, a second gear meshing with said first gear, a third shaft extending parallel to said first shaft and on which said second gear is loosely mounted; a clutch element slidable on said third shaft and adapted to engage said second gear, a cone drum fixed to said clutch element, and a disk fixed on said second shaft and adapted to be engaged by said last mentioned cone drum.

2. A power transmission means comprising a pair of conical drums, means for rotating said drums in opposite directions, an inclined shaft, a pair of disks fixed thereon, and a unitary means for moving said drums simultaneously in opposite directions into and out of engagement with the respective disks.

3. A power transmission means comprising a drive shaft, a conical drum feathered thereon, a stub shaft parallel to said drive shaft, a conical drum slidable thereon, meshing gears on said drive shaft and stub shaft, clutch elements adapted to operatively engage the gear and cone drum on the stub shaft, a third shaft inclined to said drive and stub shafts, a pair of disks on said third shaft adapted to be engaged by the respective conical drums, and a unitary means for moving said drums to cause one to engage with its disk as the other disengages.

4. A power transmission means comprising a drive shaft, a conical drum feathered thereon, a stub shaft parallel to said drive shaft, a conical drum slidable thereon, meshing gears on said drive shaft and stub shaft, clutch elements, adapted to operatively engage the gear and cone drum on the slidable shaft, a third shaft inclined to said drive and stub shafts, a pair of disks on said third shaft adapted to be engaged by the respective conical drums, and a unitary means for moving said drums to cause one to engage with its disk as the other disengages, said means including a rod slidable in the drive shaft and rigidly connected at one end to the first mentioned conical drum, and a lever operatively engaged with the said rod.

In testimony whereof I have affixed my signature.

PAUL C. HAAN.